US012496701B2

(12) United States Patent
Stockwell et al.

(10) Patent No.: US 12,496,701 B2
(45) Date of Patent: Dec. 16, 2025

(54) FOLDING STAND WITH SECURING MECHANISM

(71) Applicant: SawStop Holding LLC, Tualatin, OR (US)

(72) Inventors: Benjamin J. Stockwell, Turner, OR (US); Curt M. Kemper, Portland, OR (US); Paul H. Stasiewicz, Oregon City, OR (US)

(73) Assignee: SawStop Holding LLC, Tualatin, OR (US)

( * ) Notice: Subject to any disclaimer, the term of this patent is extended or adjusted under 35 U.S.C. 154(b) by 0 days.

(21) Appl. No.: 18/753,701

(22) Filed: Jun. 25, 2024

(65) Prior Publication Data

US 2024/0391087 A1 Nov. 28, 2024

Related U.S. Application Data

(63) Continuation of application No. 17/554,436, filed on Dec. 17, 2021, now Pat. No. 12,030,171, which is a continuation-in-part of application No. 17/407,406, filed on Aug. 20, 2021, now Pat. No. 12,226,889.

(60) Provisional application No. 63/126,725, filed on Dec. 17, 2020, provisional application No. 63/072,405, filed on Aug. 31, 2020.

(51) Int. Cl.
*B25H 1/04* (2006.01)
*B23D 45/06* (2006.01)

(52) U.S. Cl.
CPC ............... *B25H 1/04* (2013.01); *B23D 45/06* (2013.01)

(58) Field of Classification Search
CPC ........... B25H 1/04; B23D 45/06; B23D 47/02
See application file for complete search history.

(56) References Cited

U.S. PATENT DOCUMENTS

| | | |
|---|---|---|
| 1,166,865 A | 1/1916 | Stone |
| 2,096,994 A | 10/1937 | Millen |
| 2,155,896 A | 4/1939 | Goldman |
| 3,655,212 A | 4/1972 | Krass et al. |

(Continued)

FOREIGN PATENT DOCUMENTS

| | | | |
|---|---|---|---|
| CN | 211249937 U | * | 8/2020 |
| DE | 20202397 | | 2/2001 |

(Continued)

OTHER PUBLICATIONS

SKIL folding stand for table saw sold on amazon, first available date May 8, 2020 https://www.amazon.com/SKILSAW-SPT5003-FS-Folding-Stand-SPT99T/dp/B088B8BRP5 (Year: 2020).*

(Continued)

*Primary Examiner* — Terrell L McKinnon
*Assistant Examiner* — Ding Y Tan

(57) ABSTRACT

A folding stand with a pivoting securing mechanism to secure an object to the stand is disclosed. The stand may include two rails in the same horizontal plane and a securing mechanism that pivots about an axis which is perpendicular to that horizontal plane. The securing mechanism may be positionable in a locked and an unlocked position. The securing mechanism may include one or more arms that extends over a portion of the object in the locked position.

5 Claims, 9 Drawing Sheets

(56) References Cited

U.S. PATENT DOCUMENTS

| | | | |
|---|---|---|---|
| 4,039,744 A * | 8/1977 | Seaquist | H01B 17/18 |
| | | | 248/65 |
| 4,192,480 A | 3/1980 | Schmidt | |
| 4,611,823 A | 9/1986 | Haas | |
| 4,728,118 A | 3/1988 | Haas | |
| 4,967,672 A | 11/1990 | Leather | |
| 4,969,496 A | 11/1990 | Romans | |
| 4,997,147 A * | 3/1991 | Velke, Sr. | F16L 3/1215 |
| | | | 248/50 |
| 5,058,838 A * | 10/1991 | Velke, Sr. | H02B 1/202 |
| | | | 248/50 |
| 5,087,013 A | 2/1992 | Gress et al. | |
| 5,320,150 A | 6/1994 | Everts et al. | |
| 5,560,582 A | 10/1996 | Beelen | |
| 5,927,745 A | 7/1999 | Cunningham | |
| 6,113,088 A * | 9/2000 | Gakhar | B25B 5/105 |
| | | | 269/220 |
| 6,182,935 B1 | 2/2001 | Talesky | |
| 6,360,797 B1 | 3/2002 | Brazell et al. | |
| 6,471,220 B1 | 10/2002 | Babb | |
| 6,530,583 B1 | 3/2003 | Mueller | |
| 6,546,978 B2 | 4/2003 | Thoman | |
| 6,578,856 B2 | 6/2003 | Kahle | |
| 6,607,015 B1 | 8/2003 | Chen | |
| D486,504 S | 2/2004 | Huang | |
| 6,722,293 B2 * | 4/2004 | Lee | A47B 3/02 |
| | | | 108/118 |
| 6,886,836 B1 | 5/2005 | Wise | |
| 6,899,306 B1 | 5/2005 | Huang | |
| 6,942,229 B2 | 9/2005 | Brazell et al. | |
| 6,986,370 B1 | 1/2006 | Schoene et al. | |
| D519,747 S | 5/2006 | Wu | |
| 7,044,496 B2 * | 5/2006 | Holmes | A61G 1/0231 |
| | | | 280/47.131 |
| D523,041 S | 6/2006 | Wise | |
| 7,055,847 B2 | 6/2006 | Miller et al. | |
| 7,059,616 B2 | 6/2006 | Wu | |
| 7,077,421 B2 | 7/2006 | Wu | |
| 7,213,829 B2 | 5/2007 | Wu | |
| 7,222,865 B2 | 5/2007 | Chen et al. | |
| D550,476 S | 9/2007 | Liu et al. | |
| 7,278,646 B2 | 10/2007 | Chuang | |
| 7,294,789 B1 | 11/2007 | Watthanasintham | |
| 7,308,858 B2 | 12/2007 | Lo et al. | |
| 7,331,596 B2 | 2/2008 | Tiramani | |
| 7,648,155 B1 | 1/2010 | Wise | |
| 7,849,966 B2 | 12/2010 | Chiu | |
| 8,376,307 B2 * | 2/2013 | Frolov | B25H 1/005 |
| | | | 248/431 |
| 8,459,681 B2 * | 6/2013 | Chamberlain | B62J 11/13 |
| | | | 248/65 |
| 8,517,413 B2 | 8/2013 | Chen | |
| 9,156,486 B2 | 10/2015 | Liu | |
| 9,186,736 B1 | 11/2015 | Chang | |
| 9,371,954 B2 | 6/2016 | Lifshitz et al. | |
| 11,027,411 B2 | 6/2021 | Van Bergen et al. | |
| D924,282 S | 7/2021 | Liu | |
| 2002/0011719 A1 | 1/2002 | Eskridge | |
| 2004/0025759 A1 | 2/2004 | Lee | |
| 2004/0187666 A1 | 9/2004 | Huang | |
| 2004/0226425 A1 | 11/2004 | Hewitt et al. | |
| 2005/0045781 A1 | 3/2005 | Brazell | |
| 2005/0072493 A1 | 4/2005 | Velasco | |
| 2005/0093258 A1 | 5/2005 | Brazell et al. | |
| 2005/0199768 A1 | 9/2005 | Tam et al. | |
| 2006/0117614 A1 | 6/2006 | Lee et al. | |
| 2007/0102892 A1 | 5/2007 | Chiu | |
| 2007/0199586 A1 | 8/2007 | Cheng | |
| 2008/0115701 A1 | 5/2008 | Sugiura | |
| 2009/0241811 A1 | 10/2009 | Markegard et al. | |
| 2009/0289429 A1 | 11/2009 | Voong | |
| 2010/0171290 A1 | 7/2010 | Wise | |
| 2010/0213148 A1 | 8/2010 | Chen | |
| 2011/0297799 A1 | 12/2011 | Frolov | |
| 2012/0313351 A1 | 12/2012 | Chen | |
| 2013/0075990 A1 | 3/2013 | Tam et al. | |
| 2015/0020669 A1 | 1/2015 | Gass et al. | |
| 2015/0069191 A1 | 3/2015 | Filseth | |
| 2015/0191187 A1 * | 7/2015 | Liu | B25H 1/10 |
| | | | 280/30 |
| 2016/0263683 A1 | 9/2016 | Doumani et al. | |
| 2019/0168794 A1 | 6/2019 | Eyman et al. | |
| 2020/0376706 A1 | 12/2020 | Dutterer | |
| 2021/0229195 A1 | 7/2021 | Shiel | |
| 2022/0032445 A1 * | 2/2022 | Groves | B25H 1/04 |
| 2022/0057021 A1 * | 2/2022 | Budziszek | F16L 3/14 |

FOREIGN PATENT DOCUMENTS

| | | |
|---|---|---|
| EP | 0532132 | 3/1993 |
| EP | 1847358 | 10/2007 |

OTHER PUBLICATIONS

Ridgid Model 300 Compact Threading Machine Catalog Sheet No. R-96-N, Ridge Tool Company, Aug. 1, 1997.

Craftsman 10 in. Table Saw Operator's Manual, Model No. 315.218290, Sears, Roebuck and Co., Jul. 15, 2005.

Bosch GTA500 Folding Stand for Table Saw sold on Amazon, first available date Mar. 29, 2011, https://www.amazon.com/Bosch-GTA500-Folding-10-Inch-Portable/dp/B004U91EOS (Year: 2011).

Portamate PM6700 Portable Miter Saw Stand Operators Manual, Portamate, 2014.

Ryobi 10 inch table saw model No. RTS12T operators' manual dated May 13, 2019, https://www.ryobitools.com/help-plus/details/33287181209 (Year: 2019).

Craftsman table saw model No. CMXETAX69434502 instruction manual (Year: 2020).

SawStop compact table saw folding table model No. CTS-FS owner's manual Oct. 2021 (Year: 2021).

* cited by examiner

FOLDING STAND WITH SECURING MECHANISM

CROSS-REFERENCE TO RELATED APPLICATIONS

This application is a continuation of U.S. patent application Ser. No. 17/554,436, filed Dec. 17, 2021, which is a continuation-in-part of U.S. patent application Ser. No. 17/407,406 filed Aug. 20, 2021.

Ser. No. 17/554,436 also claims the benefit of and priority from U.S. Provisional Patent Application Ser. No. 63/126,725, filed Dec. 17, 2020, and Ser. No. 17/407,406 claims the benefit of and priority from U.S. Provisional Patent Application Ser. No. 63/072,405, filed Aug. 31, 2020.

All these applications are incorporated herein by reference.

FIELD

The present disclosure relates generally to folding stands, and more particularly to folding stands to support and secure a power tool.

BACKGROUND

An advantage of a compact power tool (such as a benchtop table saw) over its full-sized counterpart (such as a cabinet saw) is the space savings from utilizing a smaller tool. Another advantage is the portability of a smaller tool compared to a larger tool. But compact power tools, such as benchtop table saws, are often too small to conveniently use without elevating them off the ground to an appropriate work height. Accordingly, a stand is frequently used to elevate a compact power tool off the ground. The present disclosure shows a stand for a power tool, such as a benchtop table saw, that offers a secure and easy to use securing mechanism to hold the power tool to the stand.

Figure 1:
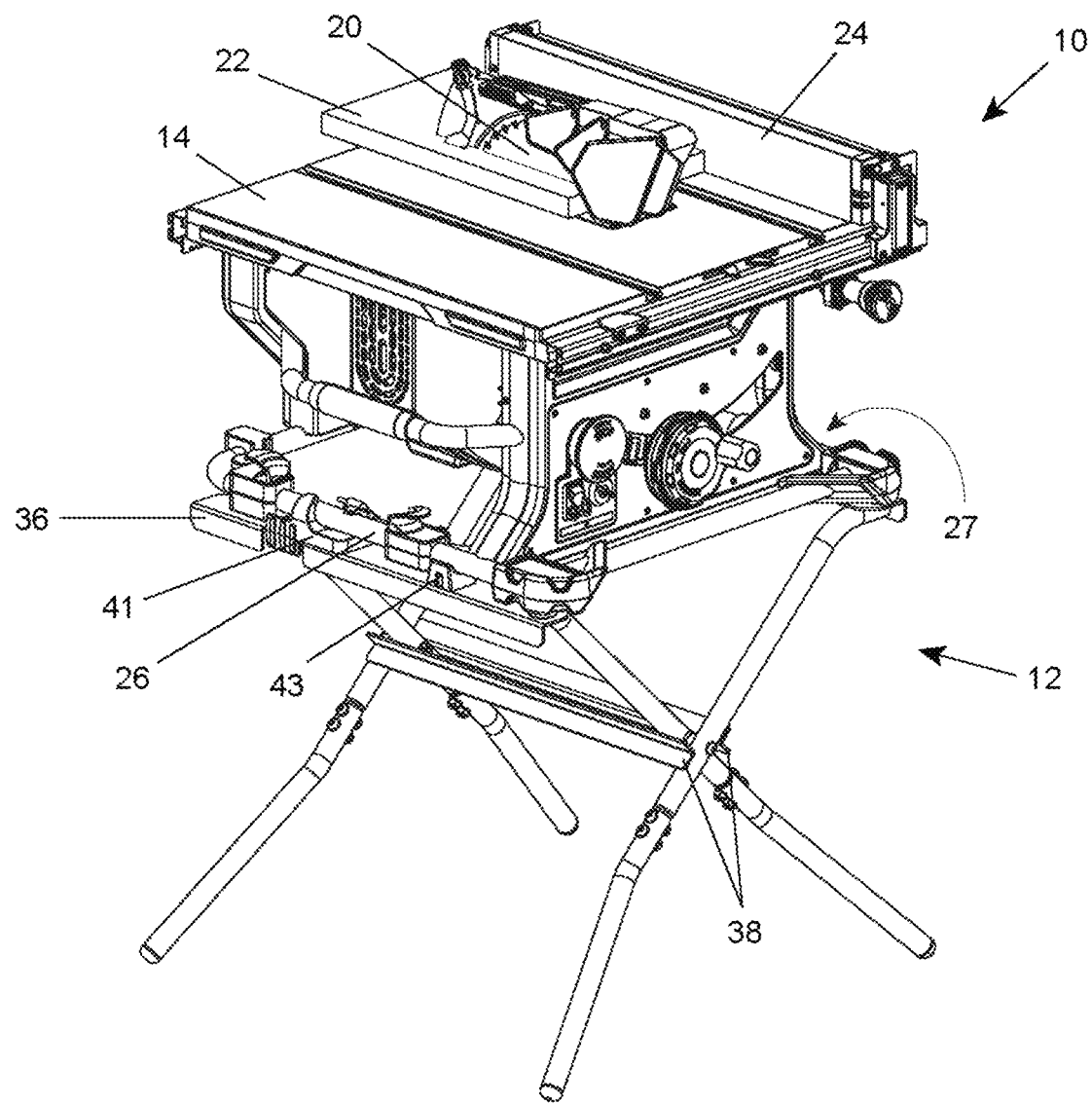
FIG. 1 shows a table saw secured to a foldable stand.

The present disclosure describes exemplary embodiments of folding stands with securing mechanisms. The embodiments as disclosed and illustrated herein are not to be considered in a limiting sense as variations are possible. Rather, the exemplary embodiments depicted in the drawings and described in detail below are intended to illustrate specific examples and implementations. It will be understood by those of skill in the art that many variations, modifications, alternatives, and equivalents of these particular exemplary embodiments are possible. Therefore, the drawings and detailed description are not intended to limit the scope of the claims to the forms, arrangements, components, and/or configurations depicted and described therein. Instead, the drawings and detailed description are intended to cover all such variations, modifications, alternatives, and equivalents as are described and suggested within the scope and spirit of the disclosure and as are defined by the claims.

While references to "exemplary embodiment", "alternative embodiments", "other embodiments", etc., may appear throughout the disclosure, repeated occurrences of such references are not intended necessarily to refer to the same embodiment(s). Rather, such references should be understood in the context in which they are provided and with reference to the figures and components with which they are associated within the narrative of the disclosure. Furthermore, reference to certain embodiments is not intended to exclude other embodiments since particular components, elements, structures, assemblies, processes, and methods described herein may be combined and/or modified in any manner that is suitable and consistent with the disclosure.

This disclosure might refer to structural elements as being "configured to," or "adapted to," perform one or more tasks, operations, or functions. Such elements may be referred to as "components," "assemblies," "mechanisms," etc. It should be understood that when such an element is described as being "configured to" or "adapted to" perform such a task or etc., this phrasing is intended to refer to a physical object or structure such as a mechanical component (e.g., arm, bracket, shaft, mount, housing, etc.), or a plurality of such components interconnected or combined into a mechanism or assembly. Furthermore, the phrasing "configured to" or "adapted to" perform a particular task or etc., is intended to indicate that the structural component or combination of components is arranged, positioned, selected, programmed, connected, combined and/or designed to perform the particular function stated. Therefore, it should be understood that all references herein of some particular element being "configured to" or "adapted to" perform some operation, task, or function refers to a physical object and not to some intangible entity, process, or function. In addition, the term "configured to" or "adapted to" does not mean "configurable to" or "adaptable to."

If used herein, the terms "first," "second," etc., when used to modify structural elements, are not intended to describe any temporal or spatial order or priority, unless such order or priority is expressly stated. Thus, for example, the terms "first mechanism" and "second mechanism" do not, unless otherwise stated, imply that the component referred to as the "first mechanism" has any priority or control over the component referred to as the "second mechanism." Furthermore, the terms are not intended to imply that the two mechanisms are either identical or non-identical unless explicitly described as such. Instead, the terms are solely intended to convey the presence of two, separate physical mechanisms.

In the drawings and description herein, specific details are disclosed for exemplary embodiments to provide a complete and thorough understanding to those of skill in the art. Nevertheless, those of skill in the art will recognize that aspects of the present disclosure can be practiced without one or more of the specific details. In some embodiments, well-known and/or readily available components, structures, and assemblies may have not been shown in detail to avoid unhelpful complexity which might hinder comprehension of the present disclosure in its entirety.

DETAILED DESCRIPTION

FIG. 1 shows a compact table saw or benchtop saw 10 installed on a foldable stand 12. Compact table saw 10 has a work surface 14, blade 20, and fence 24. The blade extends up above the work surface and a user slides a workpiece 22 on the work surface into contact with the blade to cut the workpiece. Fence 24 provides a flat surface parallel to the plane of the blade for workpiece 22 to abut and slide against when making cuts. In the disclosed embodiment, fence 24 is on the right side of blade 20.

Figure 2:
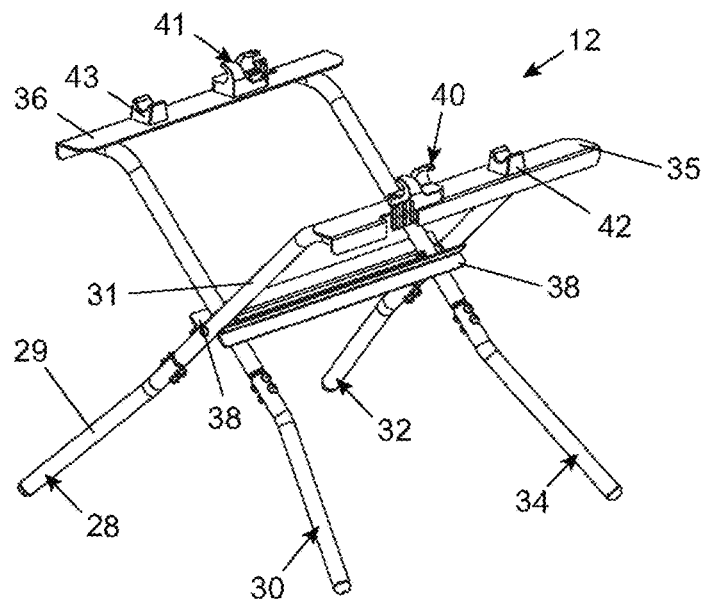
FIG. 2 shows the foldable stand of FIG. 1 without the table saw.

FIG. 2 shows foldable stand 12 isolated from the table saw. Foldable stand 12 includes legs 28, 30, 32, and 34. In the disclosed embodiment, legs 28, 30, 32, and 34 are each comprised of a top component, such as top component 31, and a bottom component, such as bottom component 29. The bottom component of each leg is bent to give the stand a wider base to increase the stability of the stand. Each leg's top component, for example top component 31, has an end that fits into each leg's bottom component, for example bottom component 29. When that end of the top component is fit into the bottom component, the two components are secured together by two bolts with nuts. Of course, other methods of securing the two components together can be used, such as a spring detent on one component that protrudes into a hole on the other component, or any other appropriate securement method known in the art. Alternatively, the legs could be made of a single component. In any event, this two-piece design allows the legs to be broken down into smaller components for shipping and storage.

Figure 4:
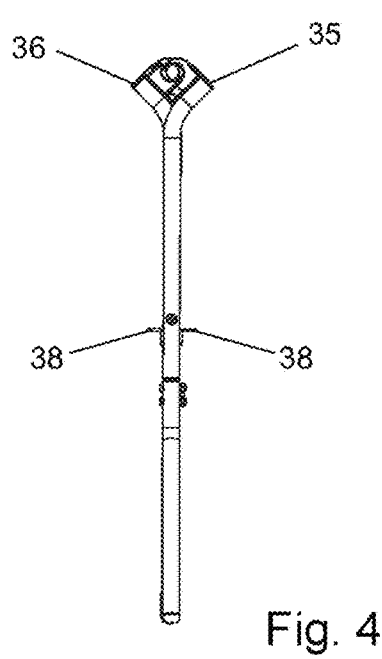
FIG. 4 shows the foldable stand in a folded position.

The stand's legs are configured to pivot, which allows the stand to be positioned in a folded configuration for storage, and an unfolded configuration for use. In the disclosed embodiment, legs 28 and 30 are pivotally joined to each other and legs 32 and 34 are pivotally joined to each other. The legs are joined by a bolt extending through both of the legs at a location near the middle of the legs. The bolt is fastened by a nut. Joining the legs in this manner allows the legs to pivot closed or, in other words, to fold together to create a smaller profile. The folded configuration is shown in FIG. 4. When the stand is in the folded configuration, the stand is nearly flat.

Figure 3:
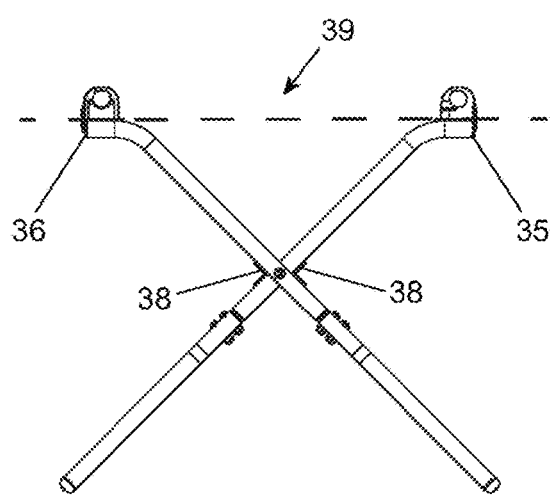
FIG. 3 is another view of the foldable stand.

Legs 28 and 32 support a rail 35 and legs 30 and 34 support a rail 36. Rail 35 and rail 36 in the disclosed embodiment are made from folded metal or angle iron (although other materials could be used) and are exact copies of each other. The legs are attached to the underside of the rails. The legs can be attached to the rails by any suitable method known in the art, such as by welding, or using screws or bolts. The legs are configured to support rails 35 and 36 so that both of the rails are in a horizontal plane 39, as shown by the dashed line in FIG. 3. In the disclosed embodiment the top surface of each rail is flat to provide a support surface for table saw 10, and those flat top surfaces define horizontal plane 39. The rails also provide horizontal stability for the stand and add to the rigidity of the stand. The rails can be sufficiently similar or even identical so that table saw 10 may be placed on and secured to the stand in the position shown in FIG. 1 or in a position where the table saw is rotated 180 degrees about a vertical axis from the position shown 5 in FIG. 1. Having the rails be similar or identical is advantageous because it simplifies manufacturing and assembly, as well as the user experience.

Stand 12 also includes stretchers 38 attached to the legs to prevent the legs from opening more than intended when the stand is positioned in the unfolded configuration. In the disclosed embodiment, stretchers 38 are made from angle iron or bent sheet metal. The stretchers act as a physical stop for the legs to rest upon when the stand is positioned in the unfolded configuration, as shown in at least FIGS. 1, 2, and 3. The stretchers also provide support and rigidity to the stand.

Stand 12 further includes two securing mechanisms 40 and 41. Securing mechanism 40 is mounted to the top flat surface of rail 35 and securing mechanism 41 is mounted to the top flat surface of rail 36. Both of the securing mechanisms are identical. Securing mechanism 40 is shown isolated in FIGS. 5-8. In the disclosed embodiment, each securing mechanism is one integral piece made from plastic, though any number of appropriate materials could be used. The securing mechanisms are pivotally attached to the top surface of the rails by a bolt that extends through hole 49 in the securing mechanisms. The bolt also extends through the rail and is fastened with a nut or an alternative fastening method on the underside of the rail. The securing mechanisms are configured to pivot around the bolt about axis generally perpendicular to horizontal plane 39.

Figure 9:
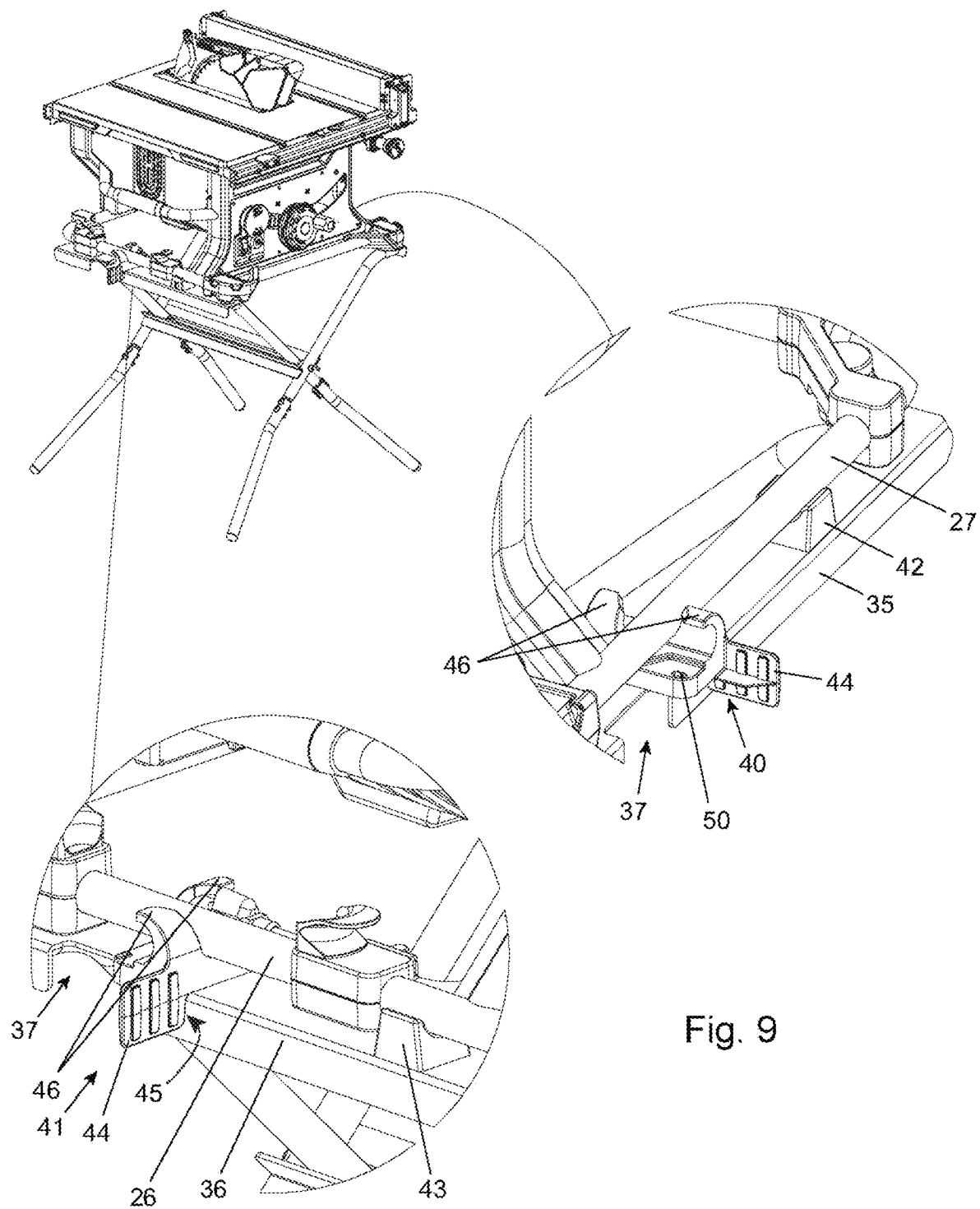
FIG. 9 shows the table saw on the foldable stand with close-up views of the securing mechanisms in an unlocked position.
Figure 10:
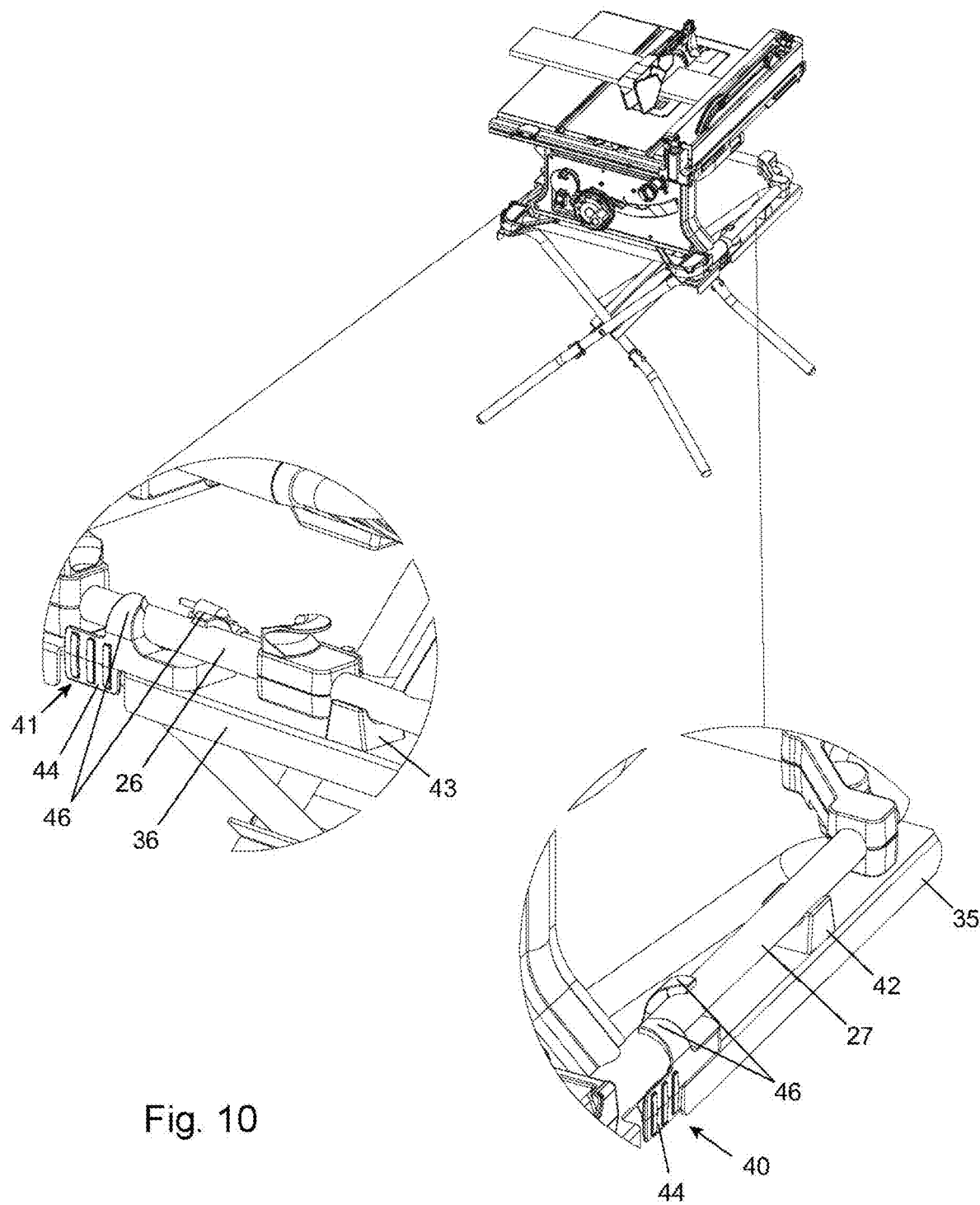
FIG. 10 shows the table saw on the foldable stand with close-up views of the securing mechanisms in a locked position.

Each securing mechanism includes a handle 44. Handle 44 allows the securing mechanisms to be pivoted by hand without the use of tools between a locked position and an unlocked position. In the unlocked position, handle 44 is perpendicular to the rail on which is it mounted, as shown in FIG. 9. Handle 44 includes a section 45 configured to abut the rail to prevent rotation of the securing mechanism beyond a predetermined amount, such 90-degrees, or less than 360 degrees. In the locked position, handle 44 is along the side of or parallel with the rail on which it is mounted, as shown in FIG. 10. In the depicted embodiment, to pivot one of the securing mechanisms 40 or 41 between its locked position and unlocked position, a user needs only to grasp handle 44 and pivot the securing mechanism 90 degrees. A cutout 37 in each of rails 35 and 36 provides adequate clearance for a user to grasp handle 44 when the securing mechanism is in the locked position. Handle 44 may be grasped from the top, bottom, or the distal end to pivot the securing mechanism.

Securing mechanisms 40 and 41 are configured to grip a portion of the power tool when pivoted to the locked position. As shown in FIG. 1, table saw 10 includes a frame member 26 that is part of a frame, housing, or base of the saw. In the depicted embodiment, frame member 26 is a cylindrical tube made of metal, plastic, or any suitable material, but it may be a solid rod or bar. A second similar frame member 27 is on the other side of the saw. In the disclosed embodiment, securing mechanism 40 grips frame member 27, and securing mechanism 41 grips frame member 26 when the securing mechanisms are in the locked position, as shown in FIG. 10. When the securing mechanisms are gripping the frame members, the frame members are secured to the stand and cannot move relative to the stand. This is accomplished by two curved arms 46 on each securing mechanism. The curved arms are configured to curve over and contact frame member 26 or 27 when the securing mechanism is in the locked position. As the securing mechanism is pivoted from the unlocked position to the locked position, curved arms 46 slightly deflect as they are forced over the frame member. This deflection biases the arms downward towards the frame member. In the locked position, the arms extend over the top of the frame member to prevent the frame member from being moved vertically. Side-to-side movement of the frame member is prevented by the arms of the securing mechanism abutting the sides of the frame member. A frictional force prevents the frame member from sliding along the length of the rails. The frictional force is caused by the downward bias of the arms. The downward bias and frictional force of the arms also prevent the securing mechanism from unintentionally pivoting to the unlocked position. While the disclosed embodiment of the securing mechanism includes two arms, the securing mechanism may alternatively be configured to include only one arm.

Figure 7:
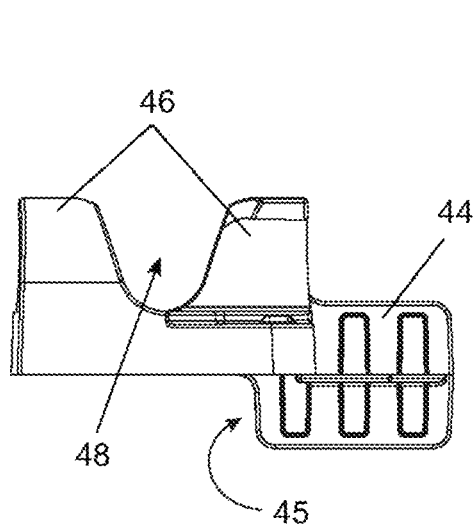
FIG. 7 is a side view of the securing mechanism.

Arms 46 are spaced apart so that a gap or channel 48 extends between the arms, as seen in FIG. 7. Channel 48 is configured to receive a portion of the power tool, such as frame member 26, when the securing mechanism is in the unlocked position. In other words, in the unlocked position, both securing mechanisms 40 and 41 present a receiving channel 48 to receive either frame member 26 or 27. Receiving channel 48 is generally U-shaped to help guide the frame member to the correct location.

Figure 8:
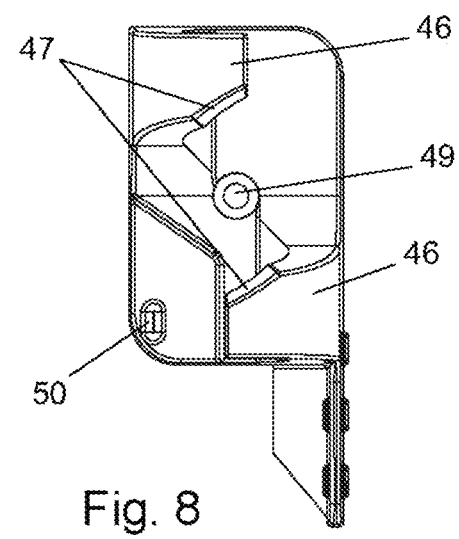
FIG. 8 is a top view of the securing mechanism.

Arms 46 also include cut-offs 47, best seen in FIG. 8, which allow room for frame member 26 or 27 to be placed in or removed from channel 48 when the securing mechanism is not fully in the unlocked position. In other words, cut-offs 47 allow the potential for a user to place the table saw on the stand or remove the table saw from the stand when one or both of the securing mechanisms are positioned slightly less than 90 degrees from the locked position. This is advantageous because a user does not have to ensure both securing mechanisms 40 and 41 are fully and perfectly in the unlocked position every time the user wants to place or remove table saw 10; the user simply has to have the securing mechanisms almost to the unlocked position.

Figure 11:
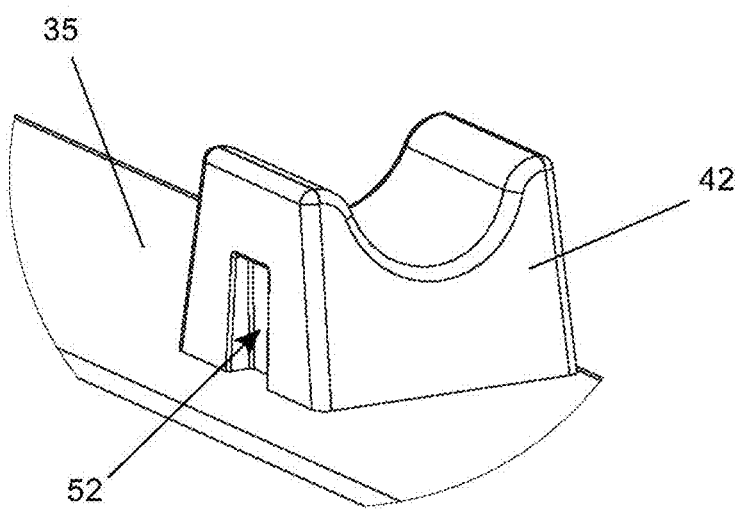
FIG. 11 is a drawing of a cradle.

Stand 12 may also include two identical cradles 42 and 43, which are configured to help guide frame member 26 into receiving channel 48. FIG. 11 shows a detailed view of cradle 42. Cradle 42 is attached to the top flat surface of rail 35, and cradle 43 is attached to the top flat surface of rail 36. Both cradles have a generally U-shaped upper surface that frame member 26 or frame member 27 rests upon. The cradles are also configured to abut a cord wrap attached to frame member 26. Having a cradle abut the cord wrap acts as a secondary means to prevent movement of the frame member along rail 36. Additionally, the cradles help prevent lateral movement of the object being secured to the stand. At least one of cradle 42 and cradle 43 could be replaced by an additional securing mechanism.

In practice, a user unfolds stand 12 and pivots securing mechanisms 40 and 41 to the unlocked position to present receiving channels 48. The user then places table saw 10 on the stand so that frame members 26 and 27 fit into receiving channels 48 in securing mechanisms 40 and 41. (As stated, the user can place the table saw on the stand in the position shown in FIG. 1 or rotated 180 degrees from the position shown in FIG. 1.) The user then grasps handles 44 and pivots securing mechanisms 40 and 41 to the locked position, wherein arms 46 curve over frame members 26 and 27 to firmly hold the frame members and secure table saw 10 to the stand. To remove table saw 10 from the stand, a user grasps handles 44 and pivots both securing mechanisms 40 and 41 from the locked position to the unlocked position. When pivoting the securing mechanisms from the locked position to the unlocked position, arms 46 are moved away from frame members 26 and 27 and no longer apply a securing force to the frame member. The user can then lift table saw 10 vertically out of receiving channels 48. The stand can then be folded for storage by pivoting the legs and bringing rails 35 and rail 36 together.

Figure 5:
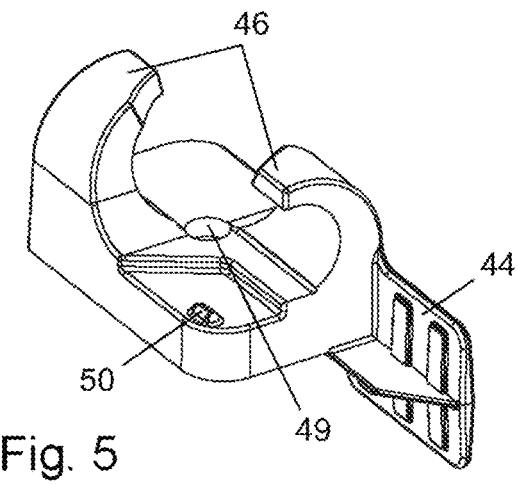
FIG. 5 is a drawing of a securing mechanism used to secure a power tool to the stand.
Figure 6:
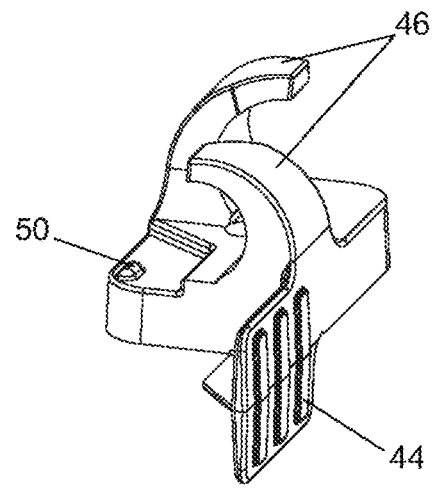
FIG. 6 is another view of the securing mechanism.

Foldable stand 12 can be configured to remain in the folded configuration. This is accomplished by detent 50 on securing mechanism 40 and detent groove 52 on cradle 42. These features are best seen in FIGS. 5 and 11, respectively. Detent 50 protrudes into detent groove 52 on cradle 42 which prevents the rails from moving independently of each other. Other appropriate securing methods known in the art may be utilized in place of or in addition to detent 50. Alternatively, the disclosed detent and detent groove may be removed entirely without affecting the main use of the stand.

Figure 12:
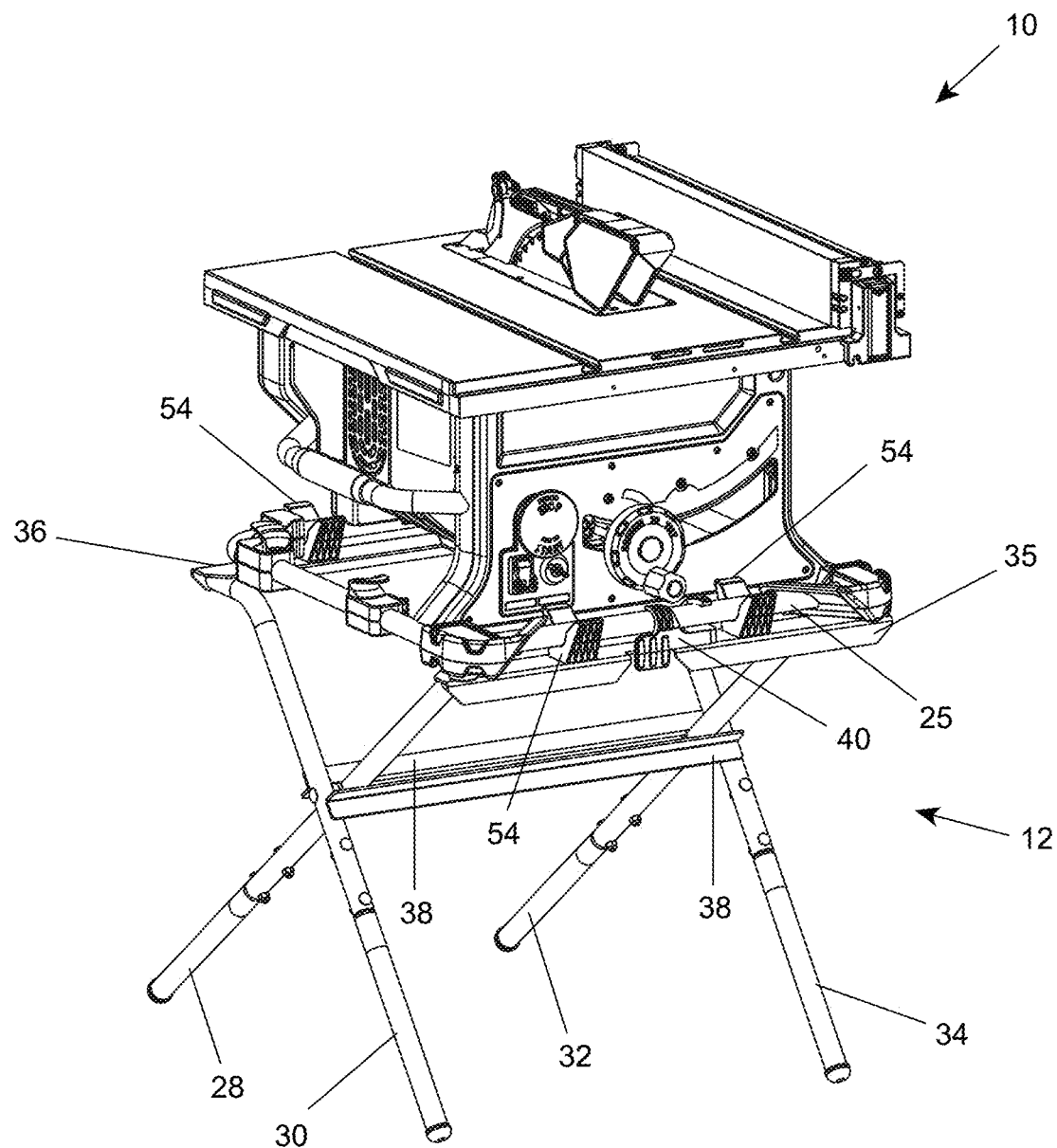
FIG. 12 shows an alternative embodiment of the foldable stand with the table saw secured in an alternative orientation.

Turning attention now to FIG. 12, an alternative embodiment of foldable stand 12 is shown. In this embodiment, stand 12 includes legs 28, 30, 32 and 34, as well as rails 35 and 36, and stretchers 38, all of which are configured and connected as described above. The embodiment of FIG. 12 also includes securing mechanisms 40 which are rotatably mounted to each rail and configured to securely grip a front frame member 25 when the securing mechanisms are rotated to the locked position. Thus, it will be seen that the embodiment of stand 12 shown in FIG. 12 is substantially similar to the embodiment shown in FIGS. 1-4.

In contrast to the embodiment shown in FIG. 1, the embodiment of the stand shown in FIG. 12 includes two cradles 54 mounted to each rail. However, it will be appreciated that both embodiments can be used with a single cradle per rail, multiple cradles per rail, or one or more cradles can be replaced by additional securing mechanisms as desired. In any event, the embodiment of FIG. 12 includes two cradles per rail which are mounted on the rail and spaced apart with securing mechanism 40 mounted between the two cradles. Furthermore, it can be seen that table saw 10 is rotated 90 degrees about a vertical axis from the orientation shown in FIG. 1. As a result, the securing mechanisms and cradles grip the frame members at the front and back of saw 10 rather than the sides of the saw. This orientation positions legs 28, 30, 32 and 34 in forward and rearward facing directions relative to the table saw, which can provide increased stability under certain conditions and with certain configurations of table saw 10.

Figure 13:
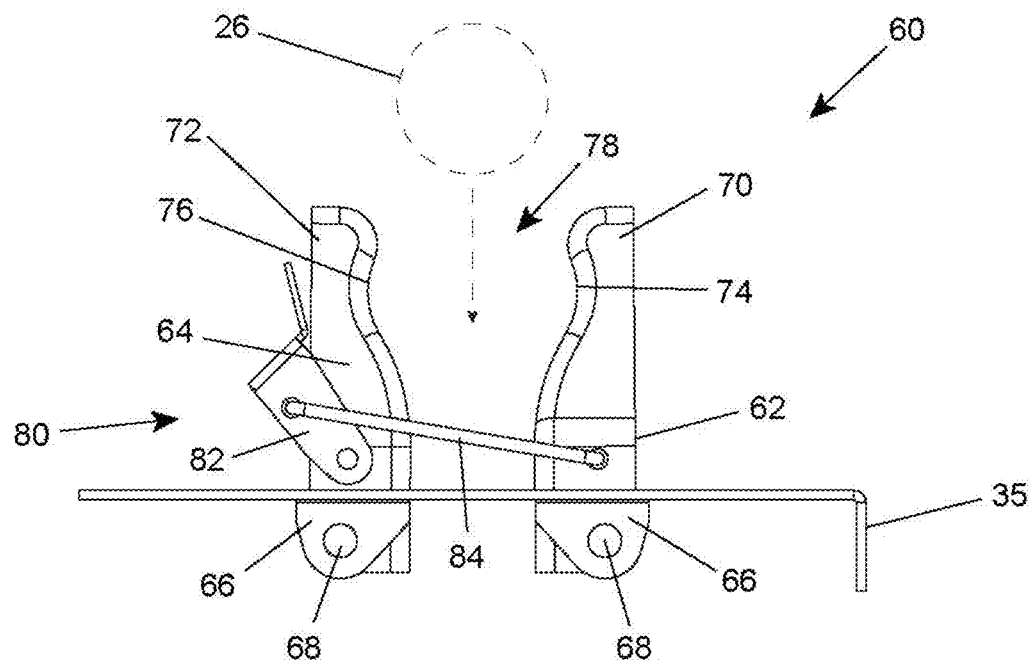
FIG. 13 shows a side view of an alternative securing mechanism in an unlocked condition.
Figure 14:
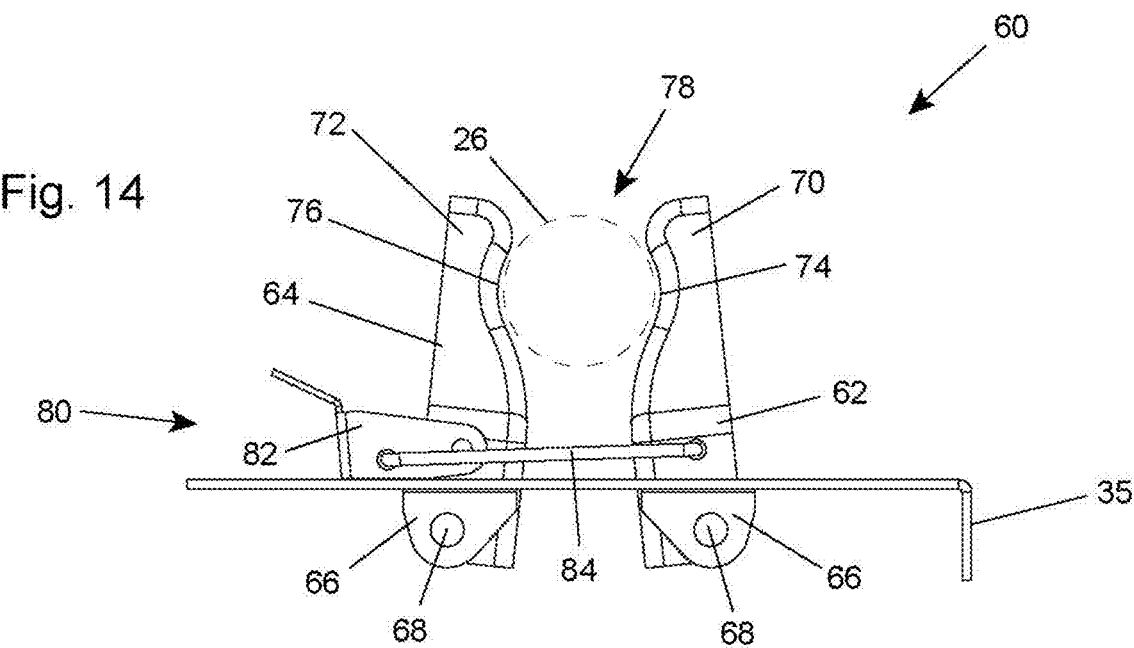
FIG. 14 shows a side view of the alternative securing mechanism in a locked condition.
Figure 15:
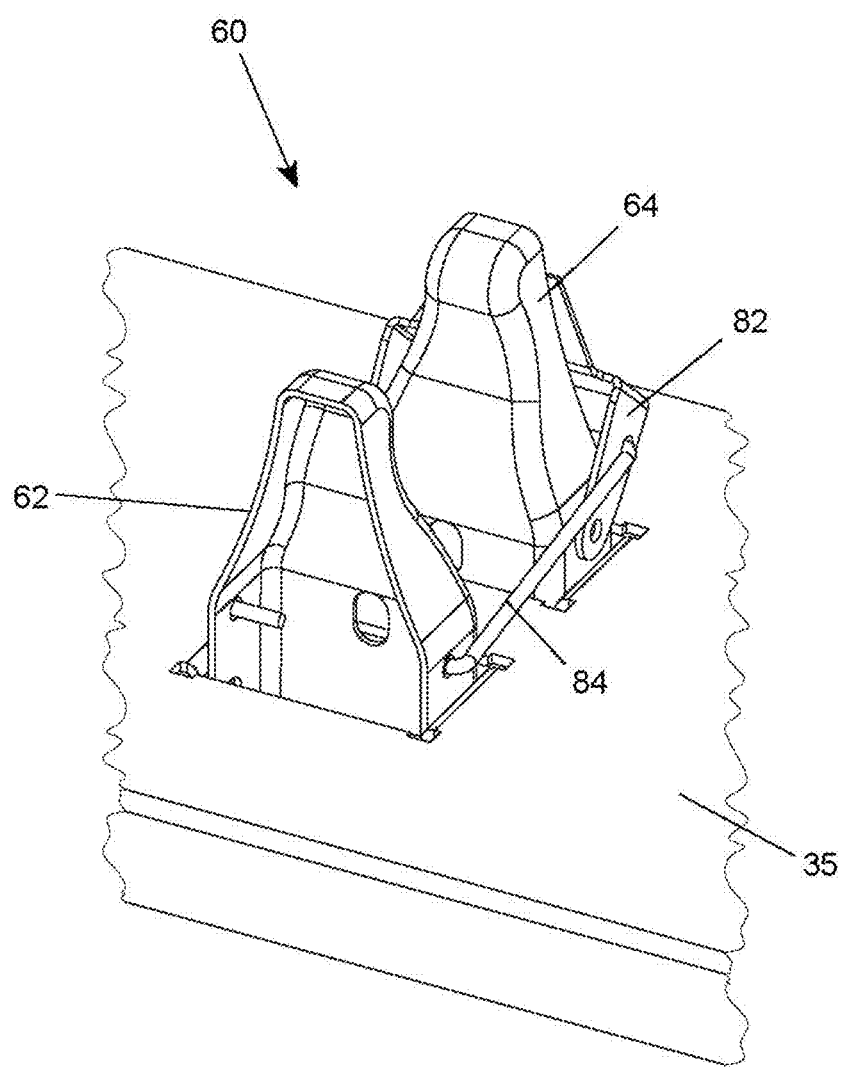
FIG. 15 shows an isometric view of the alternative securing mechanism.

Turning attention now to FIGS. 13-15, an alternative securing mechanism is shown, indicated generally at 60. It will be appreciated that this alternative securing mechanism can be used in place of, or in combination with, the securing mechanisms described above. Securing mechanism 60 includes two retaining brackets or arms 62 and 64 which are pivotally secured to mounting tabs 66 which are formed in rail 35. The pivot attachments 68 may be any of the well-known components commonly used to pivotally attach two or more members, such as bolts, pins, rods, rivets, and etc.

As shown in FIGS. 13 and 14, retaining arms 62 and 64 are mounted to the rail in opposition to one another so that the portions 70 and 72 of the arms which are distal from the pivot points can pivot toward and away from each other. Portions 70 and 72 include opposing grip regions 74 and 76 that combine to form a gap or channel 78 which is configured to receive a frame member, such as frame member 26 (indicated in dash lines). Thus, when portions 70 and 72 are pivoted away from each other as shown specifically in FIG. 13, gap 78 is wide enough to allow the frame member to move into or out of the gap freely. In contrast, when the arm portions are pivoted toward each other, the size of gap 78 constricts. Grip regions 74 and 76 are shaped so as to conform generally to the outer surface of the frame member. As a result, when portions 70 and 72 are pivoted toward the frame member positioned in the gap, the grip regions are configured to fit closely around and even press against the frame member to create a gripping force and thereby hold the frame member within the gap. This gripping force serves both to retain the frame member within the gap as well as inhibit axial movement of the frame member within the gap.

Securing mechanism 60 also includes a latch or locking assembly, indicated generally at 80, which is operable by a user or operator of the stand to pivot the two arms. Latch 80 includes a latch handle 82 which is pivotally mounted to arm 64. A wire linking member 84 is pivotally connected to both latch handle 82 and the opposing arm 62. It will be appreciated that the latch can alternatively be reversed so that the latch handle is pivotally attached to arm 62 and the linking member is pivotally attached to arm 64.

In any event, the pivot attachment points of latch handle 82 to arm 64 are positioned, relative to the pivot attachment points for the linking member, so that when the latch handle is pivoted toward portion 72 and away from rail 35, portions 70 and 72 of the arms move away from each other as shown in FIG. 13. As discussed above, this position of the arms allows the frame member to be moved into, or out of, the gap between the grip regions. This position of the latch assembly and the arms can thus be thought of as an unlatched or unlocked position. Conversely, when the latch handle is pivoted away from portion 72 and toward rail 35, the relative positions of the pivot attachment points of the latch handle and the linking member cause the portions 70 and 72 of the arms to move toward each other as shown in FIG. 14. As discussed above, this position of the arms causes the grip regions to fit around and press against the outer surface of the frame member if it is positioned within the gap. This position of the latch assembly and the arms can thus be thought of as a latched or locked position.

Furthermore, the relative positions of the pivot attachment points of the latch handle and the link member allow the latch assembly to move through a center position of minimum gap size to an over-center position where the gap is slightly larger than the minimum gap size. Since the minimum gap size is slightly smaller than the outer diameter of the frame member, the internal tension created in the securing mechanism when the arms are pressing against the frame member at the minimum gap size, is partially released when the latch handle is in the over-center position. Thus, it will be understood that the latch assembly will remain stable in the over-center position, thereby holding the frame member, until sufficient force is applied to the latch handle to pivot it up through the center position and toward portion 72. It will also be understood that the gripping force applied by the grip regions on the frame member will be sufficient to hold the frame member within the gap while the latch is in the over-center position.

Those of skill in the art will appreciate that the internal tension within the securing mechanism is generated by slight flexing of one or more of the arms, link member, frame member and/or latch handle. Furthermore, the material types and sizes of the arms, latch handle and linking member can be selected to provide the desired amount of internal tension so as to securely hold the saw to the stand without requiring a user to exert excessive force on the latch handle to move the latch assembly from unlocked to locked positions, or vice versa. Turning attention now to FIG. 15, it will be seen that the present embodiment utilizes arms which are formed from sheet metal. Similarly, the latch handle is also formed of sheet metal, while the linking member is formed of metal wire that is bent in the desired configuration. Nevertheless, it will be appreciated that the components of securing mechanism 60 could alternatively be formed of different materials and by different forming processes within the scope of the invention. In other alternative embodiments, the internal tension can be wholly or partially generated by addition biasing components such as springs. For example, torsion springs may be added to securing mechanism 60 to bias portions 70 and 72 toward the locked position. Indeed, such springs may be selected to provide sufficient biasing force to hold the frame member without the need of a locking assembly. Thus, it will be understood that all such alternatives and combinations of alternatives are within the scope of the present invention.

INDUSTRIAL APPLICABILITY

The folding stand with securing mechanism disclosed herein is applicable to power tools, and particularly to compact table saws.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions. Similarly, the recitation of "a" or "a first" element, or the equivalent thereof, should be understood to include incorporation of one or more such elements, neither requiring nor excluding two or more such elements.

It is believed that the following claims particularly point out certain combinations and sub-combinations that are directed to disclosed inventions. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A stand for supporting an object, the stand comprising:
a plurality of legs;
a plurality of rails supported by the plurality of legs; and
a securing mechanism attached to one of the rails;
where the securing mechanism is configured to pivot about an axis of rotation between a locked position and an unlocked position;
where the securing mechanism includes a handle that allows the securing mechanism to be pivoted by hand and without the use of tools between the locked position and the unlocked position, and where the handle is configured to move when the securing mechanism is pivoted between the locked position and the unlocked position;
where the securing mechanism further includes at least one arm, where the arm is configured to secure the object to the stand when in the locked position, and where the arm is connected to the handle to move with the handle; and where the securing mechanism is configured to pivot 180 degrees or less between the locked and unlocked positions.

2. The stand of claim 1, where the handle is configured to move out from one of the rails when the securing mechanism is pivoted from the locked position to the unlocked position, and is configured to move toward that rail when the securing mechanism is pivoted from the unlocked position to the locked position.

3. The stand of claim 1, where one of the rails includes a cutout to provide clearance to grasp the handle when the securing mechanism is in the locked position.

4. The stand of claim 3, where one of the rails is a front rail, and where the cutout is in the front rail.

5. The stand of claim 1, where one of the rails is a front rail, and where the securing mechanism is attached to the front rail.

* * * * *